Nov. 10, 1936.  H. R. MOULTON  2,060,104
HARDENED VITREOUS ARTICLE
Filed May 28, 1934
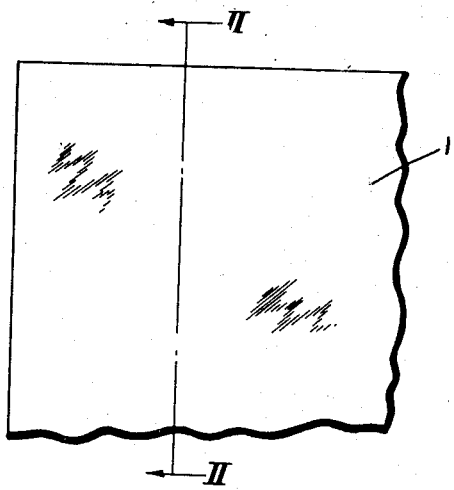
FIG. I
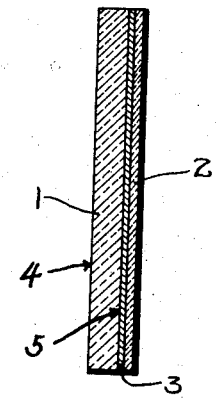
FIG. II
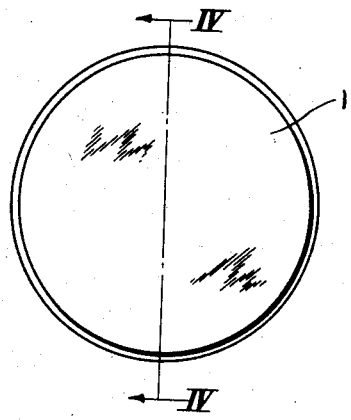
FIG. III
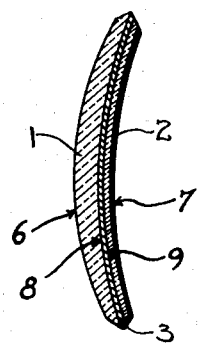
FIG. IV
INVENTOR
HAROLD R. MOULTON
BY
Harry H. Styll
ATTORNEY Patented Nov. 10, 1936

2,060,104

UNITED STATES PATENT OFFICE 2,060,104

HARDENED VITREOUS ARTICLE

Harold R. Moulton, Sturbridge, Mass., assignor to American Optical Company, Southbridge, Mass., a voluntary association of Massachusetts Application May 28, 1934, Serial No. 727,960

6 Claims. (Cl. 49—81)

This invention relates to composite safety vitreous or glass like articles and to the process of making the same.

One of the principal objects of the invention is to provide a protective article and process of making the same that will give the greatest possible impact resistance consistent with the practical dimensions of the article, that will be much thinner and lighter in weight than prior art articles having similar characteristics, that will be much cheaper to manufacture, and if broken will have less tendency to disintegrate and cause particles thereof to be projected with a danger of causing injury.

Another object of the invention is to provide an ophthalmic lens having the above characteristics and process of making the same.

Another object is to provide a protective article and process of making the same comprising two layers of vitreous or glass like material secured together by a bounding compound of a reinforcing, preferably non-brittle nature having tenacity, adhesiveness, toughness, and preferably transparency.

Another object of the invention is to provide improved means and process of forming an article of the above character which may be colored, transparent, and/or selectively opaque and which may possess the properties of absorbing ultraviolet, or infra-red rays or possessing one or more of the above characteristics.

Another object is to provide a composite article having one of its layers hardened and another of its layers unhardened.

Other objects and advantages of the invention will become apparent from the following description taken in connection with the accompanying drawing and it will be apparent that many changes in the steps of the process and the arrangement and details of construction of the parts may be made without departing from the spirit of the invention as set forth in the accompanying claims. I, therefore, do not wish to be limited to the exact processes and arrangements shown and described as the preferred forms only have been shown by way of illustration.

Referring to the drawing:

Fig. I is a fragmentary plan view of an article embodying the invention;

Fig. II is a fragmentary vertical sectional view taken on line II—II of Fig. I;

Fig. III is a plan view of a lens embodying the invention;

Fig. IV is a vertical sectional view taken on line IV—IV of Fig. III.

In the manufacture of laminated protection or safety glass articles it has been usual in the past to secure two layers of glass together by a layer of sheet celluloid or similar transparent and non-brittle material which is interposed between the said layers. This type of protection or safety glass proved quite satisfactory from the standpoint of preventing the particles of glass from being projected when broken but it was found, that although laminated, this type of glass would break as easily as a non-laminated glass article. To overcome this difficulty the two sheets of glass were hardened by subjecting them to a treatment whereby their outer surfaces would be placed under compression and their interiors under tension. This rendered the said layers more resistant to impact but it was found that in order to produce an article of this character the layers had to be formed relatively thick and the resultant article was too heavy for general use, particularly in forming ophthalmic lenses. It has also been found that a hardened piece of glass, when struck by a severe blow disintegrates and causes particles thereof to be projected in all directions. The laminating or bonding material employed in forming such an article tends to overcome most of the nature of the hardened layers to explode and scatter but it has been found, however, that there is a slight residual tendency for some of the particles to be projected, and if placed before the eyes of an individual may cause injury. The requirement of two hardened layers also greatly increased the cost of manufacture of such articles and in many respects such articles were impractical for use.

It, therefore, is one of the primary objects of applicant's invention to overcome the above difficulties by providing an article of the above character which will give substantially the same impact resistance is an article formed of two hardened layers of glass and having similar effective surface areas but which will be much cheaper, thinner and lighter in weight and which will overcome the undesired tendency when broken of having some of the particles projected with the danger of causing injury.

Another important object of applicant's invention is to provide a hardened composite, protection or safety vitreous or glass like article more particularly adapted in its general characteristics for use in forming ophthalmic lenses.

Referring more particularly to the drawing wherein like characters of reference designate like parts throughout the several views the device embodying the invention comprises broadly two layers, 1 and 2, of vitreous or glass like material secured together by a layer of preferably non-brittle bonding means 3. The layers 1 and 2 may be formed in relatively flat sheets, as shown in Figures I and II, or may be formed meniscus shaped having spherical or cylindrical surfaces thereon or may be a combination of said shapes and surfaces as desired. The meniscus shape and surfaces illustrated in Figures III and IV is adapted particularly for use in forming ophthalmic lenses.

The layer 1 of vitreous or glass like material is relatively thick and is subjected to a hardening process wherein one of its surfaces, preferably its outer or exposed surface 4 will be caused to be in compression and its inner surface 5 under tension. If desired, all of its outer surfaces may be caused to be under compression and the interior thereof under tension. In all instances the result desired is that this layer 1 be hardened and more resistant to impact than before being treated. This layer of vitreous or glass like material may be ground and polished to finished optical surfaces before or after the hardening process as desired, it being simply necessary to shape the portion 1 to substantially the finished shape desired prior to performing the hardening operation.

The hardening of the layer 1 may be accomplished by several different methods such as by sudden chilling after heating to a predetermined temperature by dropping in oil, or by applying a jet of air, steam, or other gas to either or both surfaces after heating or by any other method or methods known to the art. The layer of vitreous material 1 may be sized and shaped before or after the hardening process as desired, it being merely necessary to employ different means for bringing about the desired result, as for example, the layer 1 may be cut and edged to shape prior to the hardening process without danger of breakage, but after the hardening process it is difficult to cut without possible breakage. The shaping can, however, be accomplished by grinding, it being understood that if the latter process is used the layer must be formed substantially to its finished shape before hardening.

The second layer 2 of vitreous or glass like material is not hardened and is merely intended to serve as a protective cover plate for the laminating or bonding material and for this reason may be formed very thin. This second layer of vitreous or glass like material is ground and polished to optical surfaces and is sized, shaped, etc. to fit the first layer 1, this shaping being done before or after the layers are assembled.

The two layers 1 and 2 are then secured together preferably by transparent bonding means of a reinforcing preferably non-brittle nature such as cellulose nitrate compound, cellulose acetate compound, polymerized vinyl compound, polymerized styrene, polymerized acrylic acid, polymerized acrylic acid esters, or any other means known to the art having toughness, tenacity and adhesiveness and being preferably transparent. It is to be understood that the above materials are given only by way of illustration and that applicant does not intend to be limited to the use of only such bonding materials as it is commonly known that several other materials, not listed herein, may be employed.

It is to be understood that the bonding means as well as either or both of the layers of vitreous or glass like material may be colored, transparent or selectively opaque as desired, or may possess the property of absorbing ultra-violet and/or infra-red rays or may possess one or more of the above characteristics, depending upon the nature and requirements of the article.

The contiguous surfaces of the two layers 1 and 2 may differ by an amount equal to the thickness of the laminating or bonding material or by any other predetermined amount depending upon the index of refraction of the laminating or bonding medium and/or the desired focal power of the finished assembly. This is particularly true in the case of an ophthalmic lens such as that shown in Figures III and IV wherein the indices of refraction of all the layers, thicknesses, and surface curvatures, 6, 7, 8, and 9 are the controlling factors of the power of the finished lens.

It has been found from practice that a hardened article such as that shown and described by applicant will give the greatest possible impact resistance consistent with the practical dimensions of the article, that is, an article formed with one hardened layer and another which is unhardened or substantially strain free will provide substantially the same resistance to impact as an article formed of two layers which are both hardened and having substantially similar effective areas. Attention is directed to the fact that in order to enable the hardening of a layer of vitreous or glass like material it is essential that the said layer be relatively thick and for this reason the resultant article, if formed of two hardened layers, will be exceptionally thick, heavy and in many instances impractical for use, particularly in forming ophthalmic lenses. Another important factor in lenses of this character is the cost of manufacture which in the case of two hardened layers is much greater than if only one hardened layer is used in combination with an unhardened substantially strain free layer as shown and claimed by applicant.

It has been found from practice that a hardened article formed of glass like material, if struck by a severe blow, will explode and scatter. Due to this fact, it is quite important that a bonding material be used which possesses sufficient strength to prevent this scattering. Although this result has very nearly been accomplished, it has been found in some instances that there is a slight residual tendency for some of the particles to fly and in the case of an ophthalmic lens which is worn before the eye, such flying particles would be exceptionally dangerous to the wearer. It, therefore, is one of the important objects of this invention to obviate this defect in hardened ophthalmic lenses by providing a layer of substantially strain free vitreous or glass like material on the side of the lens nearest the eye so that there will be no tendency for this layer to explode as would be the case if hardened and struck by a severe impact. The bonding or laminating material in all instances is such that it maintains a holding action on the substantially strain free layer and will not permit particles thereof to be projected. This layer merely cracks but the particles stay in place. This, therefore, obviates the projection of such particles and prevents possible injury therefrom. This feature is exceptionally important in ophthalmic lenses and is one which applicant is specifically striving to obtain.

It is also apparent that, due to the fact that such lenses are held before the eye by mountings which are supported by the nose or other parts of the face of the wearer, it is of great importance to reduce the thickness and weight of the lenses, and this feature is also being specifically set out as one of the important objects of this invention.

Summing up the essence of the present invention, attention is directed to the fact that the hardened layer 1 is primarily intended to provide impact resistance, the bonding or laminating material 3 is primarily intended to overcome the tendency of said hardened layers to explode and scatter when struck by a severe blow and the relatively thin unhardened and substantially strain free layer 2 is provided primarily for the purpose of protecting the bonding or laminating material and also for maintaining a good optical definition. This unhardened and substantially strain free layer does not have a tendency to explode and fly like the hardened layer and for this reason is positively held by the bonding or laminating material against being projected if broken.

A process of forming articles of the above character is substantially as follows, it being understood that some of the steps may be varied or alternated as desired. The layers of vitreous or glass like material after having been sized, shaped, polished, etc. are carefully cleaned. The contiguous faces thereof may or may not be treated with a coating of adhesive such as a solution of gelatine in water or glacial acetic acid, or other commonly known solutions after which the laminating or bonding material is placed between the coated surfaces. The layers are then pressed together and are heated to a degree sufficient to cause adhesion. If the layers have not been previously shaped and sized, this operation may be performed after they have been secured together, it being understood that this operation is performed by the usual prior art methods. If desired, the layers after having been cleaned may be heated prior to placing a gob of polymerized vinyl compounds, polymerized styrene, polymerized acrylic acid, polymerized acrylic acid esters, etc., plasticized with chlorinated di-phenyl, diethyl phthalate or other known means between said layers. The layers are then pressed together and shaped and sized as desired.

By vitreous material it is to be understood that applicant refers to material which is clear, substantially transparent, substantially isotropic, and possessing the general appearance, workability and optical properties of glass.

From the foregoing description it will be seen that applicant has provided a new and novel protection and safety article and process of making the same whereby the finished article will be relatively thin, light in weight, less expensive to manufacture, and more adaptable for general use.

Having described my invention, I claim:

1. A composite safety hardened lens having a refractive correction comprising a layer of non-brittle bonding material faced on both sides with adherent layers of vitreous material, one of said adherent layers being relatively thick and hardened to resist impact and having a finished convex curved optical surface on the exposed face thereof shaped to produce a controlling factor of the finished refractive correction of the lens and the other of said adherent layers being relatively thin and substantially strain-free and having a finished optical surface on the exposed face thereof which, due to the unhardened nature of said layer, may be altered in curvature to produce a variable controlling factor of the finished refractive correction of the lens, said hardened layer, during the use of the lens, being on the side opposite the eye of the wearer so that its convex surface will be exposed to possible impact.

2. A composite safety hardened lens having a refractive correction comprising a layer of non-brittle bonding material of a known index of refraction faced on both sides with adherent layers of vitreous material of known indices of refraction, one of said adherent layers being relatively thick and hardened to resist impact and having a finished convex curved optical surface on the exposed face thereof shaped to produce a controlling factor of the finished refractive correction of the lens and the other of said adherent layers being relatively thin and substantially strain-free and having a finished optical surface on the exposed face thereof which, due to the unhardened nature of said layer, may be altered in curvature to produce a variable controlling factor of the finished refractive correction of the lens, said hardened layer, during the use of the lens, being on the side opposite the eye of the wearer so that its convex surface will be exposed to possible impact, the said surface curvatures determining the refractive correction of the finished lens being controlled according to the indices of refraction of the various layers of the lens to produce the resultant refractive power desired.

3. A composite hardened lens having a refractive correction comprising a layer of non-brittle bonding material of a known index of refraction faced on both sides with adherent layers of vitreous material of known indices of refraction, one of said adherent layers being relatively thick and hardened to resist impact and having finished optical surfaces on its opposite faces, the exposed face thereof being convex and shaped to produce a controlling factor of the finished refractive correction of the lens and the other of said adherent layers being relatively thin and substantially strain-free and having finished optical surfaces on its opposite faces, the nature of the material of said layer being such that the exposed face thereof may be altered in curvature to produce a variable controlling factor of the finished refractive correction of the lens, said hardened layer, during the use of the lens, being on the side opposite the eye of the wearer so that its convex surface will be exposed to possible impact, the said surface curvatures determining the refractive correction of the finished lens being controlled according to the indices of refraction of the various layers of the lens and the inner surface curvatures of the adherent layers to produce the resultant refractive power desired.

4. The process of producing a safety hardened lens having a refractive correction comprising forming a relatively thick layer of vitreous material with a convex curved surface on one side thereof which is shaped nearly to and which may be finished to a curvature to produce a controlling factor of the finished refractive correction of the lens, treating the said layer to render it more resistant to impact, finishing the convex surface to the desired finished optical surface, forming a relatively thin substantially strain-free layer of vitreous material to fit in adjacent relation with the first layer and with a finished optical surface on one side thereof to produce another controlling factor of the finished refractive correction of the lens and securing the said layers of vitreous material together in aligned relation with each other by means of a non-brittle bonding material with the finished refractive surfaces exposed, the said lens being so formed that the convex surface of the hardened layer will be on the 5. The process of producing a safety hardened lens having a refractive correction comprising a relatively thick layer of vitreous material of a known index of refraction with a convex curved surface on one side thereof which is shaped nearly to and which may be finished to a curvature to produce a controlling factor of the finished refractive correction of the lens, treating the said layer to render it more resistant to impact, finishing the convex surface to the desired finished optical surface, forming a relatively thin substantially strain-free layer of vitreous material of a known index of refraction to fit in adjacent relation with the first layer and with a finished optical surface on one side thereof to produce another controlling factor of the finished refractive correction of the lens and securing the said layers of vitreous material together in aligned relation with each other by means of a non-brittle bonding material of a known index of refraction with the finished refractive surfaces exposed, the said lens being so formed that the convex surface of the hardened layer will be on the side thereof opposite the eye of the wearer during use, the various surface curvatures determining the refractive correction of the finished lens being controlled according to the indices of refraction of the various layers of the lens to produce the resultant refractive power desired.

6. The process of producing a safety hardened lens having a refractive correction comprising forming a relatively thick layer of vitreous material of a known index of refraction with curved semi-finished surfaces on its opposite faces, the exposed face thereof being convex and being shaped nearly to and which may be finished to a curvature to produce a controlling factor of the finished refractive correction of the lens, treating the said layer to cause a portion thereof to be under compression and a portion to be under tension to render the said layer more resistant to impact, finishing the convex surface to the desired finished optical surface, forming a relatively thin substantially strain-free layer of vitreous material of a known index of refraction to fit in adjacent relation with the first layer and with finished optical surfaces on its opposite faces, the nature of the glass of said layer being such that the exposed face thereof may be altered in curvature to produce a variable controlling factor of the finished refractive correction of the lens and securing the said layers of vitreous material together in aligned relation with each other by means of a non-brittle bonding material of a known index of refraction, the said lens being so formed that the convex surface of the hardened layer will be on the side thereof opposite the eye of the wearer during use, the various curvatures determining the refractive correction of the finished lens being controlled according to the indices of refraction of the various layers of the lens and the inner adjacent surface curvatures of the adherent layers to produce the resultant refractive power desired.

HAROLD R. MOULTON.